(12) United States Patent
Jensen

(10) Patent No.: US 8,061,777 B2
(45) Date of Patent: Nov. 22, 2011

(54) SYSTEM FOR SEAT-ACTUATED HEAD REST EXTENSION AND RETRACTION

(75) Inventor: Matthew T. Jensen, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 12/609,085

(22) Filed: Oct. 30, 2009

(65) Prior Publication Data
US 2011/0101738 A1    May 5, 2011

(51) Int. Cl.
*A47C 1/10*    (2006.01)
(52) U.S. Cl. .... 297/391; 297/403; 297/410; 297/378.12
(58) Field of Classification Search ................. 297/391, 297/403, 410, 378.12
See application file for complete search history.

(56) References Cited

U.S. PATENT DOCUMENTS

| | | | |
|---|---|---|---|
| 3,065,029 A | 11/1962 | Spound et al. | |
| 5,681,079 A * | 10/1997 | Robinson | 297/61 |
| 5,918,940 A * | 7/1999 | Wakamatsu et al. | 297/410 |
| 6,074,010 A * | 6/2000 | Takeda | 297/391 |
| 6,192,565 B1 * | 2/2001 | Tame | 297/61 |
| 6,557,933 B1 | 5/2003 | Schambre et al. | |
| 7,059,681 B2 * | 6/2006 | Kubo | 297/410 |
| 7,066,545 B2 * | 6/2006 | Terada et al. | 297/410 |
| 7,118,171 B2 | 10/2006 | Fowler et al. | |
| 7,121,625 B2 * | 10/2006 | Malsch et al. | 297/410 |
| 7,140,687 B2 * | 11/2006 | Hoekstra et al. | 297/410 |
| 7,185,950 B2 * | 3/2007 | Pettersson et al. | 297/216.12 |
| 7,210,734 B1 * | 5/2007 | Yetukuri et al. | 297/61 |
| 7,374,239 B1 | 5/2008 | Jayasuriya et al. | |
| 7,484,808 B2 * | 2/2009 | Yetukuri et al. | 297/408 |
| 7,866,754 B2 * | 1/2011 | Furukawa et al. | 297/391 |
| 2003/0075026 A1 * | 4/2003 | Schulz et al. | 81/413 |
| 2007/0145803 A1 * | 6/2007 | Kopetzky et al. | 297/410 |
| 2007/0240940 A1 * | 10/2007 | Moriarty | 182/238 |
| 2008/0284226 A1 * | 11/2008 | Brunner et al. | 297/410 |

* cited by examiner

*Primary Examiner* — Laurie Cranmer
(74) *Attorney, Agent, or Firm* — Shook, Hardy & Bacon LLP

(57) ABSTRACT

A head rest system for an automotive vehicle seat movable between an extended position when the seat back of the vehicle seat is in its upright position and a retracted position when the seat back is in its lowered position. The system includes a seat base, a seat back pivotably attached to the seat base, a head rest movably attached to the seat back by a head rest attachment assembly, and a head rest movement balancing portion. The head rest attachment assembly includes a fixed portion attached to the seat back and a movable portion. The fixed portion includes a spool assembly. The movable portion includes a pair of spaced apart posts attached to the underside of the head rest and a latching assembly. The spaced apart posts are slidably attached to the fixed portion. The head rest movement balancing portion includes a pair of spaced apart constant force springs. Each of the springs has a spool attachment end and a latching assembly attachment end. A cable is provided. One end of the cable is operatively associated with the latching assembly and at the other end is attached to the seat base. A series of pulleys restrain the cable and guide its operation. The disclosed system fixes the head rest at the required height, prevents the passenger from adjusting the head rest when the seat is in an occupiable position, and retracts the head rest automatically when the seat back is folded thereby providing sufficient clearances.

20 Claims, 7 Drawing Sheets

SYSTEM FOR SEAT-ACTUATED HEAD REST EXTENSION AND RETRACTION

TECHNICAL FIELD

The disclosed invention relates generally to automotive head rests. More particularly, the disclosed invention relates to automotive head rests that extend and retract on selective movement of the seat back.

BACKGROUND OF THE INVENTION

Seat head rests have been used for many years in automotive vehicles. These head rests generally extend vertically from the seat back and may prevent neck hyperextension. For optimum effectiveness, such head rests must be adjusted properly. Frequently, however, the seat occupant incorrectly adjusts the height of the headrest, often making the position choice for reasons of comfort only.

Complicating the proper positioning of the head rest relative to the seat back is the fact that many automotive vehicles today are configured so that one or more seat backs may be folded flat or relatively flat against the seat base, thereby allowing the back of the seat back to be used as storage space for packages. Often the head rest interferes with proper movement of the seat back from its upright position to its lowered position when the operator is arranging the seat for package storage. The head rest is then moved to its lowered position and in some instances it remains in its lowered position when the seat back is returned to its upright position for occupant seating. The lowered position may not be optimum for passenger safety.

A further complication relates to the anticipated requirement for taller head rest positions than current products can provide. However, this greater fixed height often precludes existing seat designs from other functions such as the above-described seat back lowering for use in storing packages, or an inability to meet the height requirement without relying on the customer to adjust the position of the head rest.

Accordingly, what is desired is a system that fixes the head restraint at the taller required height when a passenger is sitting in the seat, prevents the passenger from adjusting the head restraint height while sitting in the seat, and which retracts the head restraint automatically when the user lowers the seat back thereby providing sufficient package clearances. Known systems are not capable of simultaneously achieving both the height degree anticipated to be required for proper operation of a seat assembly and the capability of moving from an upright position to a lowered position.

SUMMARY OF THE INVENTION

The disclosed invention represents advancement in the art of head rests for vehicles. The head rest of the disclosed invention defines a system which includes a seat base, a seat back pivotably attached to the seat base, a head rest movably attached to the seat back by a head rest attachment assembly, and a head rest movement balancing portion.

The head rest attachment assembly includes a fixed portion attached to the seat back and a movable portion. The fixed portion includes a spool assembly. The movable portion includes a pair of spaced apart posts attached to the underside of the head rest and a latching assembly. The spaced apart posts are slidably attached to the fixed portion.

The head rest movement balancing portion includes a pair of constant force (CF) springs. Each of the CF springs has a spool attachment end and a latching assembly attachment end.

A cable is provided. One end of the cable is operatively associated with the latching assembly and one end is attached to the seat base. A series of pulleys restrain the cable and guide its operation.

When the seat back is in its upright position the head rest is extended. When the seat back is moved to its lowered position the head rest is retracted.

Accordingly, the disclosed invention provides an improvement over known arrangements by providing the CF springs to provide high travel distances combined with low effort. Other advantages provided by the disclosed invention are that the mechanism is contained entirely in the seat back and thus seat appearance is unchanged, the other existing seat mechanisms are unaffected reducing the development cycle and reducing the amount of revalidation testing, the extension and retraction functions are automatically synchronized with the movement of the seat back so that the user does not have to take additional steps, the mechanism is simple and cost effective, uses existing seat concepts in a new and unique way, and the arrangement may be easily adapted to operate as a powered system.

Other advantages and features of the invention will become apparent when viewed in light of the detailed description of the preferred embodiment when taken in conjunction with the attached drawings and the appended claims.

BRIEF DESCRIPTION OF THE DRAWINGS

For a more complete understanding of this invention, reference should now be made to the embodiment illustrated in greater detail in the accompanying drawings and described below by way of examples of the invention wherein.

DETAILED DESCRIPTION OF THE PREFERRED EMBODIMENT

Figure 1:
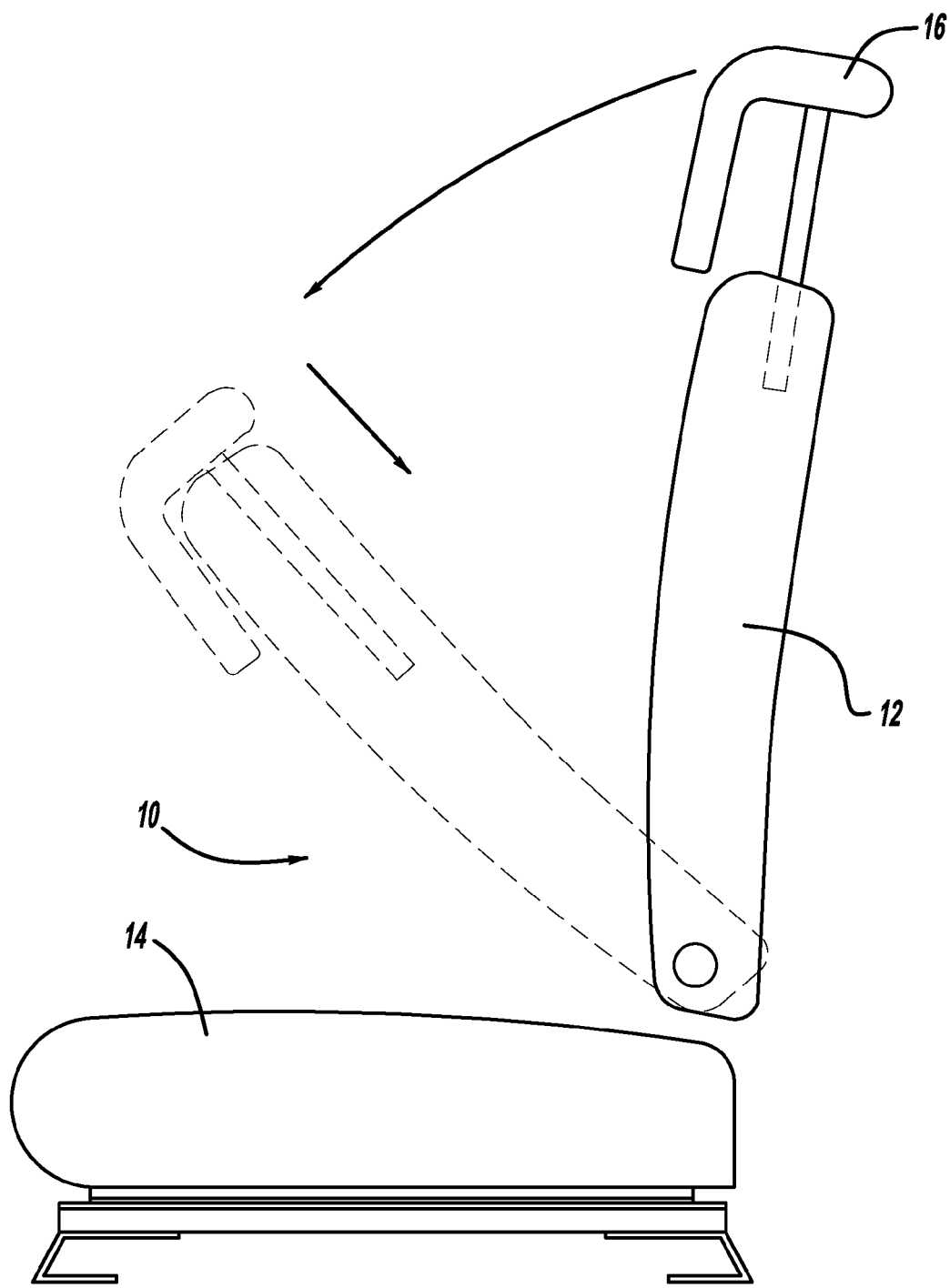
FIG. 1 is a side view of a seat assembly incorporating the self-actuated head rest system of the disclosed invention showing, in solid lines, the seat back in its upright position and the head rest in its extended position and, in broken lines, the seat back being moved toward its lowered position with the head rest in its retracted position.

In the following figures, the same reference numerals are used to refer to the same components. In the following description, various operating parameters and components are described for one constructed embodiment. These specific parameters and components are included as examples and are not meant to be limiting.

With reference to FIG. 1, a side view of a seat assembly of the disclosed invention is shown and is generally illustrated as 10. The seat assembly 10 includes a seat back 12 and a seat base 14. Attached to the seat back 12 is a movable head rest 16. The head rest 16 is movable between an extended position when the seat back 12 is in its upright position (as illustrated in solid lines) and a retracted position when the seat back 12 is moved to its lowered position (such downward movement being illustrated in broken lines).

Figure 2:
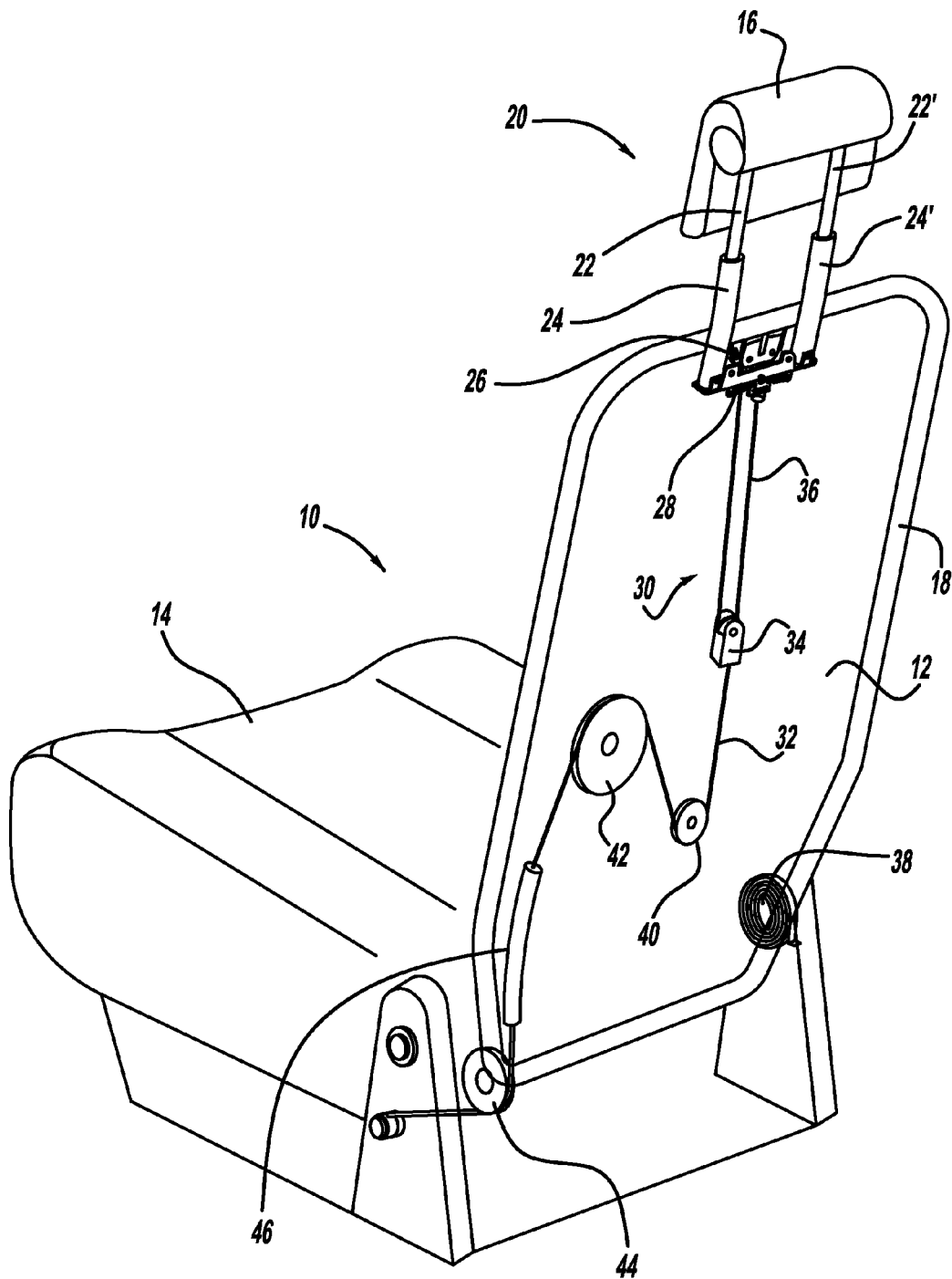
FIG. 2 is a perspective view of the seat assembly shown in FIG. 1 in which the seat back is in its upright position and the head rest is in its extended position.
Figure 3:
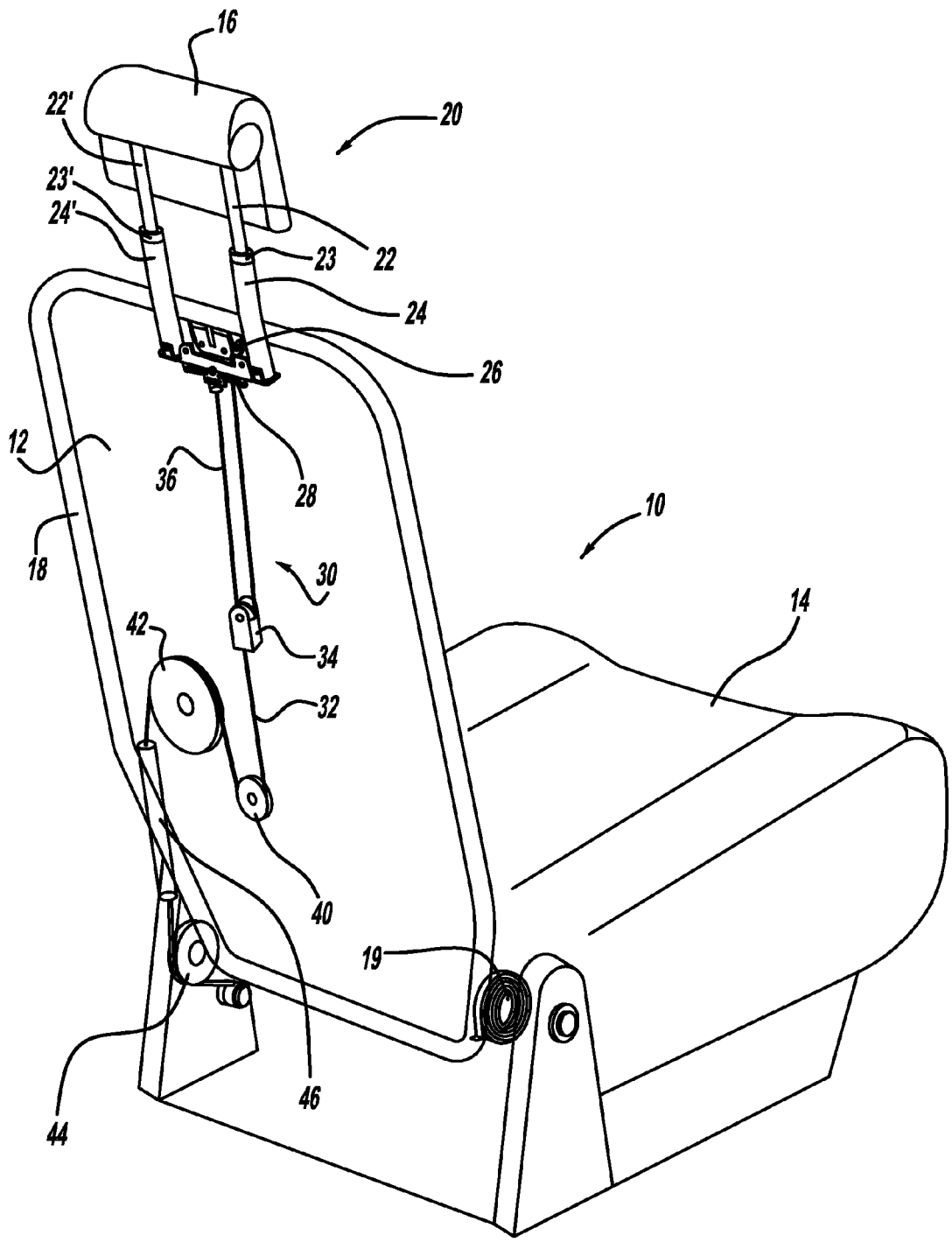
FIG. 3, like FIG. 2, is also a perspective view of the seat assembly shown in FIG. 1 but taken from a different angle to particularly illustrate the clockspring.

FIG. 2 illustrates a perspective view of the seat assembly 10 with the seat back 12 in its upright position. The covering of the seat back 12 has been removed in this view as has part of the covering of the seat base 14 so that the details of the disclosed invention may be viewed. FIG. 3 is also a perspective view of the seat assembly 10 showing the seat back 12 in its upright position, but taken from an angle different from that of FIG. 2.

The seat back 12 includes a frame 18 which is itself pivotably attached to the seat base 14. The frame 18 as shown is shown for illustration purposes only and it is to be understood that other seat frame constructions are possible. As is known in the art, a counterbalancing clockspring 19, discussed below, may be provided. Accordingly, the illustrated configuration is intended as being illustrative and not limiting.

The head rest 16 is attached to the seat back 12 by a head rest assembly, generally illustrated as 20. The head rest assembly 20 includes a pair of movable posts 22 and 22' which extend downward from the underside of the head rest 16, a pair of guide sleeves 23 and 23', a pair of tubes 24 and 24', and an attachment base 26. One or more of the tubes 24 and 24' and the attachment base 26 are fixedly attached to the seat frame 18. The head rest assembly 20 further includes a movable latching mechanism 28. The head rest assembly 20 is described in greater detail below with respect to FIGS. 4 and 5.

Still referring to FIG. 2, a cable assembly, generally illustrated as 30, is provided in association with the head rest assembly 20. The cable assembly 30 includes a cable 32, a floating pulley assembly 34, and a floating pulley cable 36. One end of the cable 32 is attached to the floating pulley assembly 34 and the other end of the cable 32 is attached to the seat base 14. One end of the floating pulley cable 36 is attached to the movable latching mechanism 28 and the other end of the floating pulley cable 36 is attached to the seat back 12.

To both support and guide the cable 32, a series of pulleys is provided. This series of pulleys includes a first seat back pulley 40, a second seat back pulley 42, and a seat base pulley 44. The number, size and arrangement of the pulleys may be altered as needed for specific applications. The configuration is shown for purposes of illustration only.

In addition to the pulleys 40, 42 and 44, a cable guide 46 is provided approximately between the seat back 12 and the seat base 14. The cable guide 46 is provided for both structural purposes and for appearance purposes as is understood by those skilled in the art.

Figure 4:
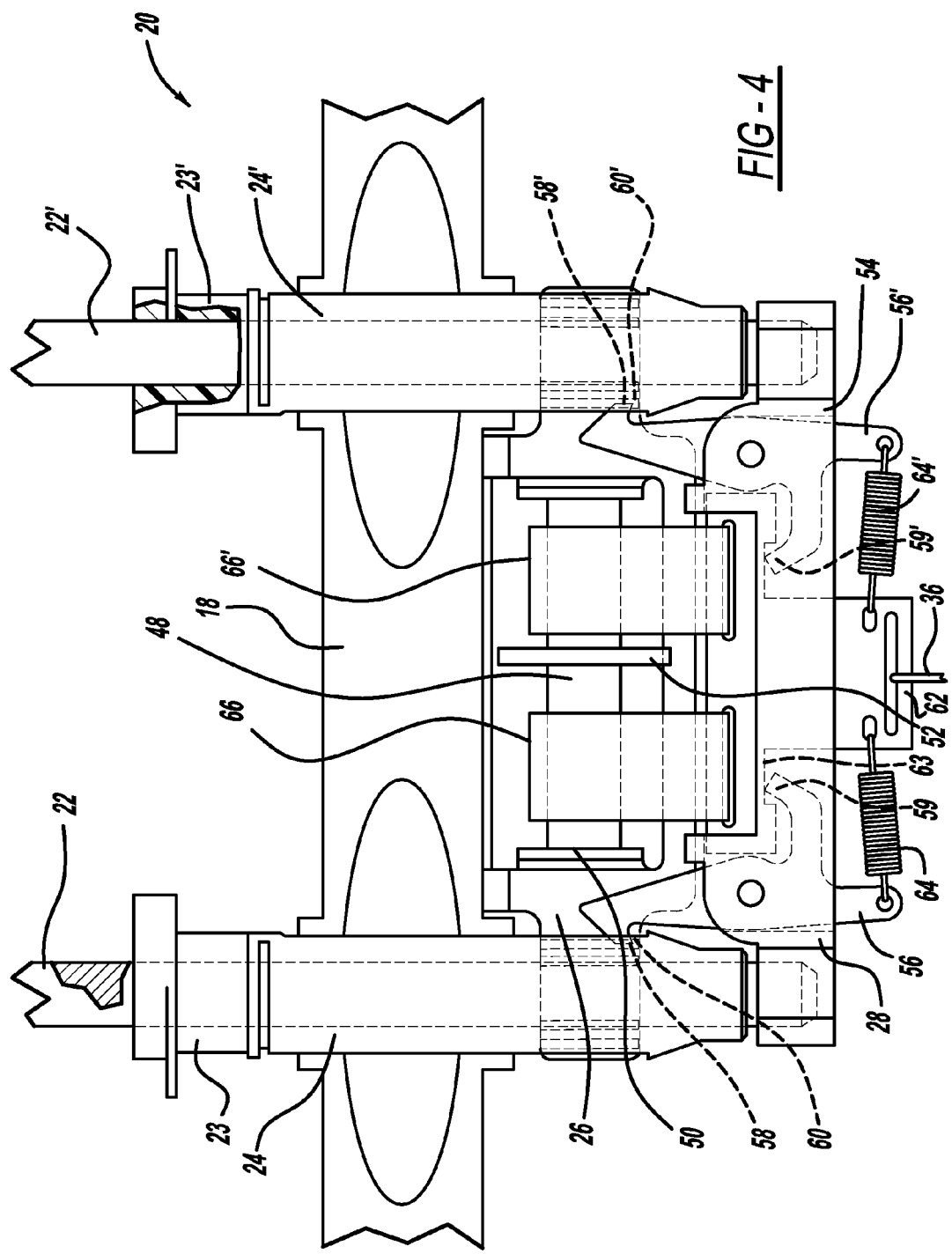
FIG. 4 is a close up schematic view of the head rest locking and release mechanism shown in its extended and latched position.
Figure 5:
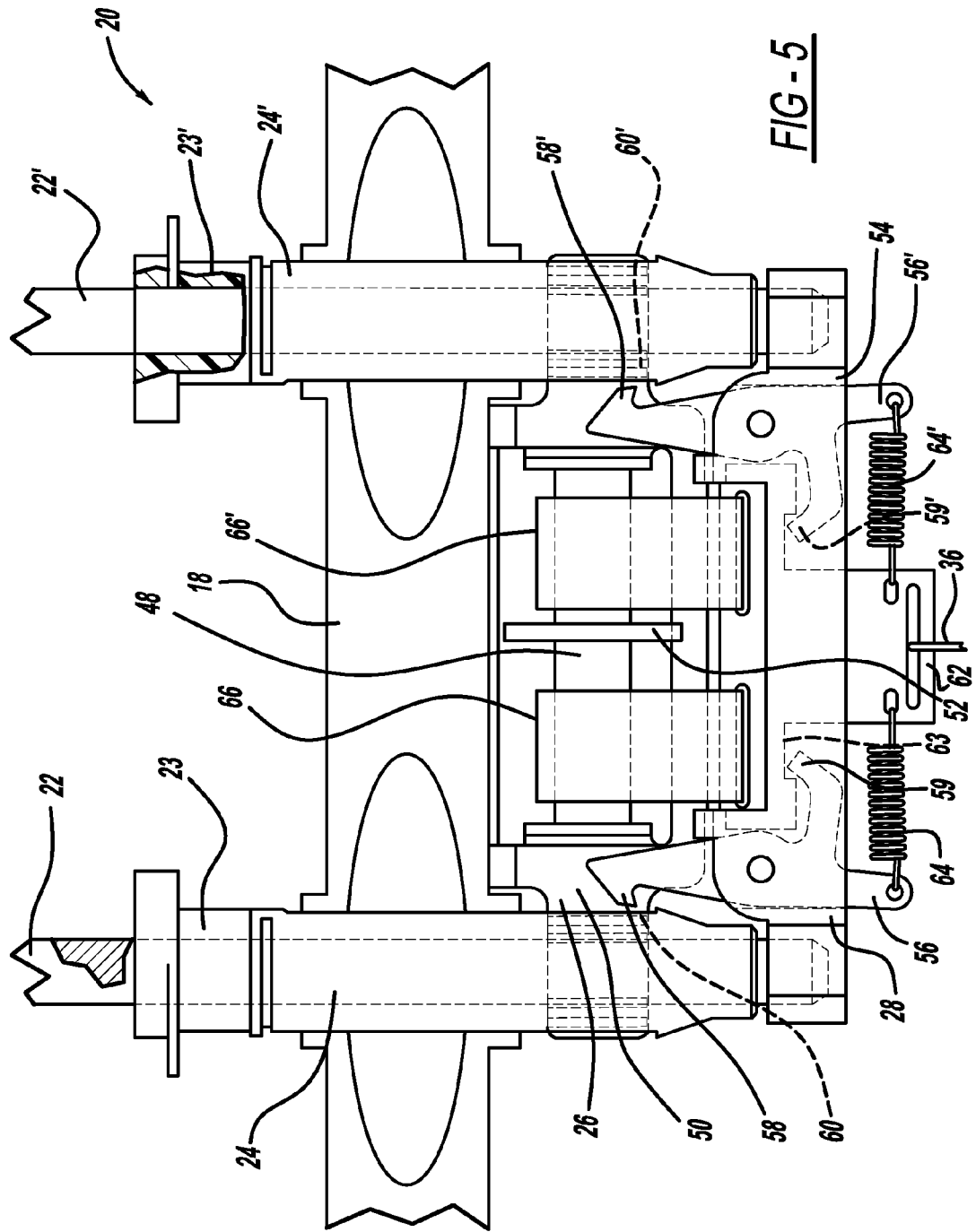
FIG. 5 is a view similar to that of FIG. 4 wherein the head rest locking and release mechanism is shown in its extended and unlatched position.

As noted above, the head rest assembly 20 is shown in detail in FIGS. 4 and 5. With reference thereto, the attachment base 26 includes a spool 48. The spool 48 is rotatably mounted on a spool axle 50. A divider 52 is operatively attached to the spool 48.

The movable latching mechanism 28 includes a body 54 which is attached to the lowermost ends of the posts 22 and 22'. A spaced apart pair of attachment levers 56 and 56' is provided. The attachment lever 56 is pivotably attached to the body 54. The attachment lever 56' is also pivotably attached to the body 54. The attachment lever 56 includes an engagement hook 58 and an arm 59. The attachment lever 56' includes an engagement hook 58' and an arm 59'. The engagement hook 58 is provided to selectively engage a slot 60 formed in the tube 24 while the engagement hook 58' is provided to selectively engage a slot 60' formed in the tube 24'.

The body 54 further includes a slidable flange 62 to which the floating pulley cable 36 is preferably attached. Also preferably attached to the slidable flange 62 is a spring 64 attached to the attachment lever 56 and a spring 64' attached to the attachment lever 56'.

The body 54 includes a slot 63 into which the arms 59 and 59' and the slidable flange 62 movably fit.

Figure 6:
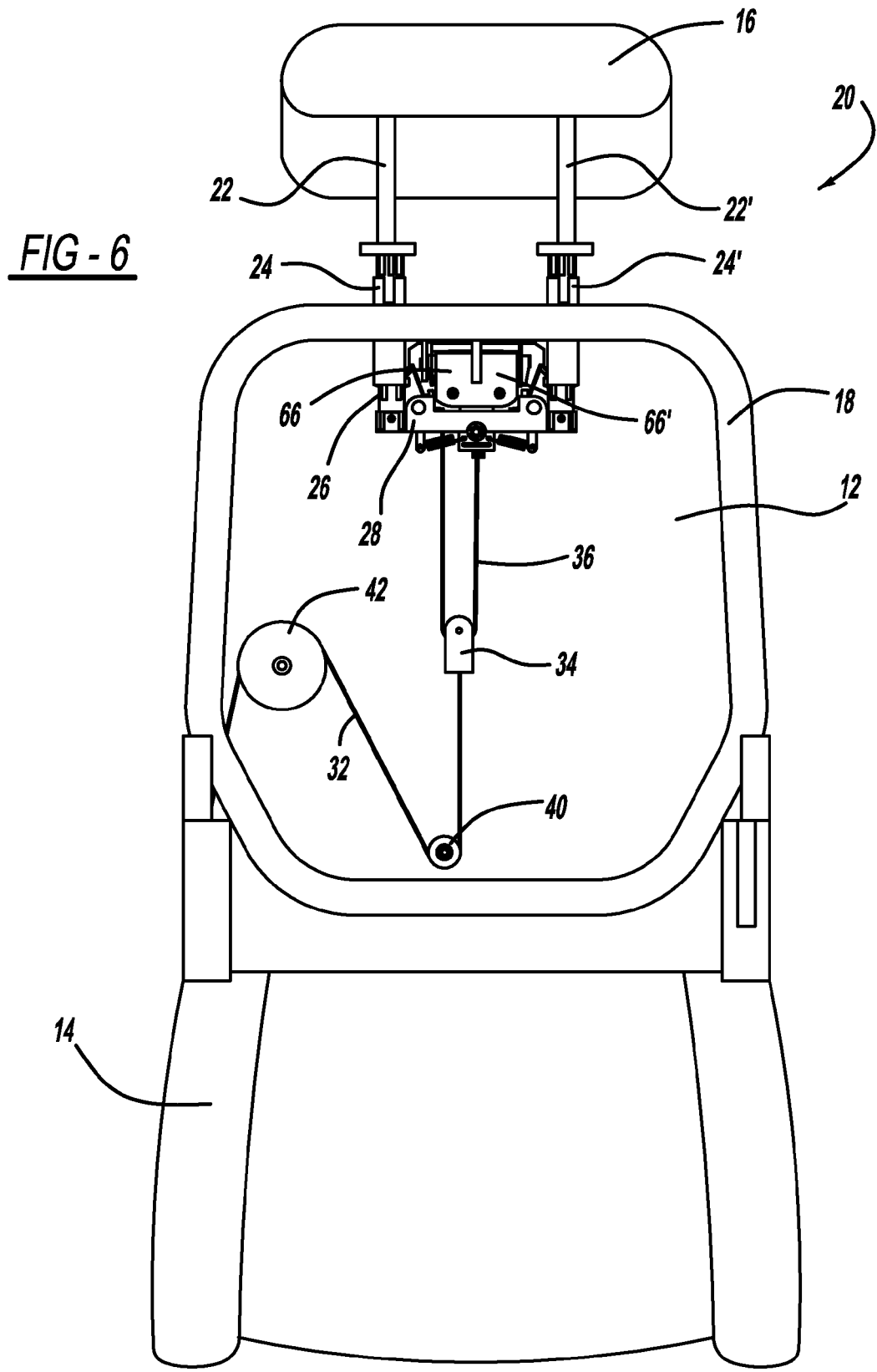
FIG. 6 is a back view of the seat assembly incorporating the self-actuated head rest system of the disclosed invention showing the seat back in its upright position and the head rest is in its extended position.
Figure 7:
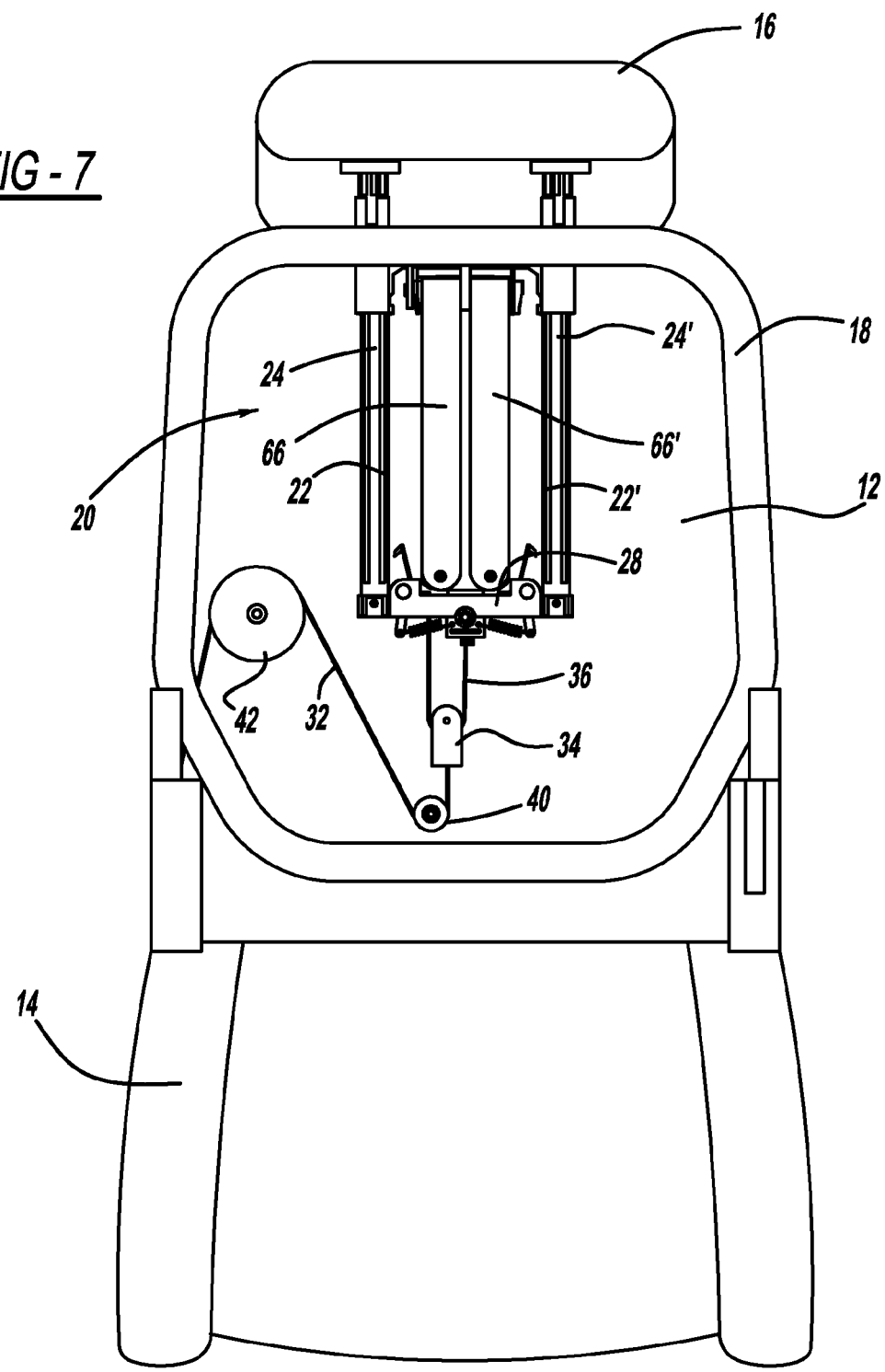
FIG. 7 is a view similar to that of FIG. 6 wherein the seat back is in its lowered position and the head rest is in its retracted position.

In addition to the elements of the head rest assembly 20 shown in FIGS. 4 and 5 and discussed in relation thereto, a pair of CF springs 66 and 66' is provided as is shown in FIGS. 6 and 7. Referring to these figures, the upper ends of the CF springs 66 and 66' are attached to the spool 48 while the lower ends of the CF springs 66 and 66' are attached to the slidable flange 62 of the movable latching mechanism 28. The clocksprings shown in FIGS. 2 and 3 are provided to counterbalance the forces of the CF springs 66 and 66'. It should be noted that while a pair of spaced apart CF springs is shown, it is to be understood that a single CF spring or more than two CF springs may be used while remaining faithful to the spirit of the disclosed invention.

In operation, when the seat back 12 is in its upright position the head rest 16 is fully extended as shown in FIG. 6. In this position the CF springs 66 and 66' are wound upon the spool 48, the engagement hook 58 of the attachment lever 56 is in locking engagement with the slot 60 of the tube 24, and the engagement hook 58' of the attachment lever 56' is in locking engagement with the slot 60' of tube 24'. Thus locked in position, the head rest 16 is fixed in its fully extended position.

When the operator moves the seat back 12 forward toward its lowered position the displacement of the seat back 12 pulls on the CF springs 66 and 66'through the cable 32. The cable 32, being fixedly attached to the seat base 14, pulls upon the floating pulley assembly 34, which in turn applies downward force on the floating pulley cable 36. Insofar as the floating pulley cable 36 is fixedly attached to the slidable flange 62 of the movable latching mechanism 28 and is fixedly attached to the seat back 12, the floating pulley cable 36 pulls upon the slidable flange 62, thus moving it downward within slot 63 formed in the body 54. As the slidable flange 62 is moved downward, it presses downward upon the arm 59 and simultaneously presses downward upon the arm 59'. This pressure upon the arms 59 and 59' cause the attachment levers 56 and 56' to be pivoted, thus releasing the hooks 58 and 58' from the slots 60 and 60'. Now released, the body 54 is free to generally move downward, pulling upon the attached movable posts 22 and 22', pulling on the CF springs 66 and 66', and thus effecting retraction of the head rest 16. The released condition is also illustrated in FIG. 5.

As the seat back 12 is raised to its upright position, the tension in the CF springs 66 and 66' is relieved allowing the CF springs 66 and 66' to retract, thereby lifting the head rest 16 to the compliant height. Upon reaching the compliant height, the locking mechanism automatically engages whereby the hooks 58 and 58' of the attachment levers 56 and 56' respectively, urged by the springs 64 and 64', reengage the slots 60 and 60' of the tubes 24 and 24' respectively.

The arrangement of CF springs, cables, pulleys and the clockspring is balanced to make the seat back 12 effectively weightless. This also allows for the cable 32 to be attached to a power motor (not shown) instead of the seat base 14. The extension and retraction function can then be controlled electronically with customer input from physically folding the seat, or a button on the seat, I/P and/or key fob. With a power system, obstacle detection may also be provided.

The foregoing discussion discloses and describes an exemplary embodiment of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A head rest system for a vehicle comprising:
   a seat base;
   a seat back attached to said seat base;
   a head rest attached to said seat back;
   a head rest attachment assembly having a movable latching mechanism and a constant force spring spool assembly, said constant force spring spool assembly including at least one constant force spring and a spool, said spring having an end attached to said spool and an end attached to said movable latching mechanism;
   a cable having an end attached to said movable latching mechanism and an end attached to said seat base; and
   at least one cable pulley attached to said seat back.

2. The head rest system for a vehicle of claim 1 further including a clockspring operatively associated with said seat base and said seat back.

3. The head rest system for a vehicle of claim 1 wherein said at least one constant force spring defines a pair of spaced apart constant force springs.

4. The head rest system for a vehicle of claim 1 wherein said at least one constant force spring is spring steel.

5. The head rest system for a vehicle of claim 1 wherein said at least one cable pulley attached to said seat back comprises a first cable pulley and a second cable pulley attached to said seat back.

6. The head rest system for a vehicle of claim 5 further including a floating pulley to which said cable is attached.

7. The head rest system for a vehicle of claim 6 further including a floating pulley cable having a first end and a second end, said first end of said floating pulley cable being attached to said movable latch assembly and said second end of said floating pulley cable being attached to said seat back.

8. The head rest system for a vehicle of claim 1 further including a cable pulley attached to said seat base.

9. The head rest system for a vehicle of claim 1 wherein said head rest attachment assembly includes a pair of spaced apart posts, said movable latching mechanism being fixed relative to said pair of spaced apart posts.

10. The head rest system for a vehicle of claim 9 wherein said movable latching assembly further includes a latch pivotably attached thereto for selective engagement with at least one of said spaced apart posts.

11. A head rest system for a vehicle comprising:
    a seat base;
    a seat back attached to said seat base;
    a head rest;
    a head rest attachment assembly having a spool and a movable latching mechanism;
    at least one constant force spring having an end attached to said spool and an end attached to said movable latching mechanism;
    a cable having an end attached to said movable latching mechanism and an end attached to said seat base; and
    at least one cable pulley attached to said seat back.

12. The head rest system for a vehicle of claim 11 further including a clockspring operatively associated with said seat base and said seat back.

13. The head rest system for a vehicle of claim 11 wherein said at least one constant force spring is a pair of spaced apart constant force springs.

14. The head rest system for a vehicle of claim 11 wherein said at least one constant force spring is spring steel.

15. The head rest system for a vehicle of claim 11 wherein said at least one cable pulley attached to said seat back comprises a first cable pulley and a second cable pulley attached to said seat back.

16. The head rest system for a vehicle of claim 15 further including a floating pulley to which said cable is attached.

17. The head rest system for a vehicle of claim 16 further including a floating pulley cable having a first end and a second end, said first end of said floating pulley cable being attached to said movable latch assembly and said second end of said floating pulley cable being attached to said seat back.

18. The head rest system for a vehicle of claim 11 further including a cable pulley attached to said seat base.

19. The head rest system for a vehicle of claim 11 wherein said head rest attachment assembly includes a pair of spaced apart posts, said movable latching mechanism being fixed relative to said pair of spaced apart posts and wherein said movable latching assembly further includes a latch pivotably attached thereto for selective engagement with at least one of said spaced apart posts.

20. A head rest system for a vehicle comprising:
    a seat base;
    a seat back attached to said seat base;
    a head rest assembly having a head rest, a fixed portion attached to said seat back and a movable portion, said movable portion including at least one spring;
    a cable having an end attached to said movable portion and an end attached to said seat base; and
    a cable pulley attached to said seat back.

* * * * *